Patented Oct. 26, 1948

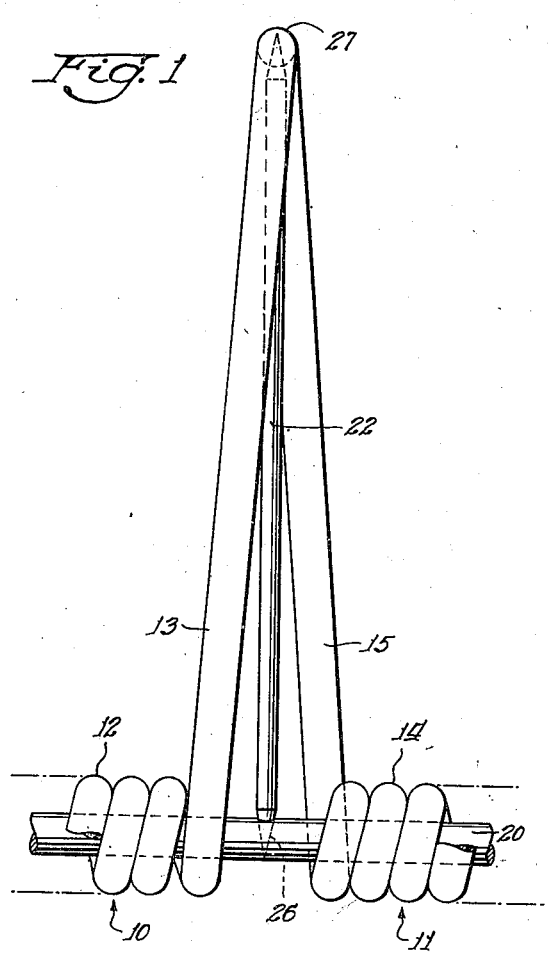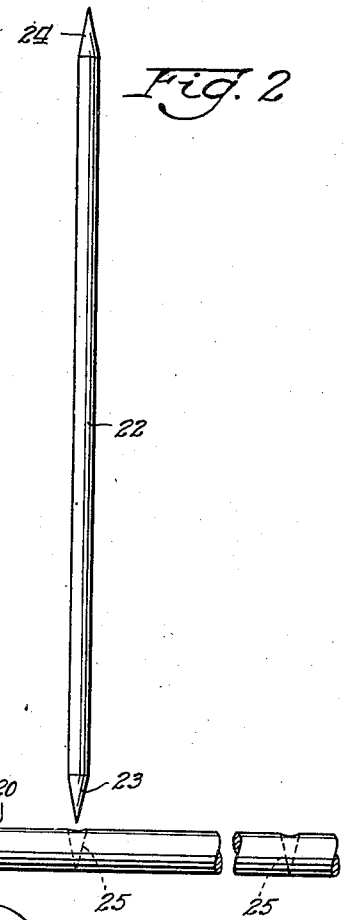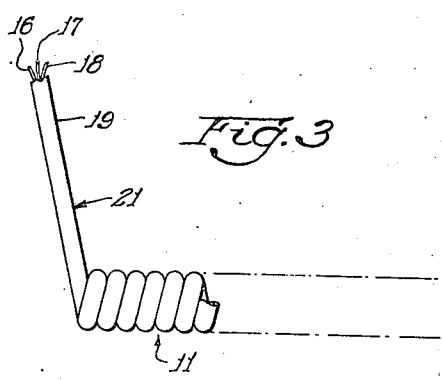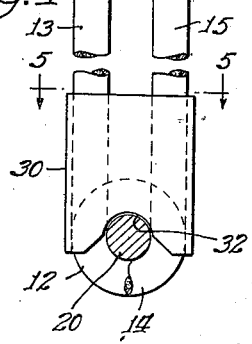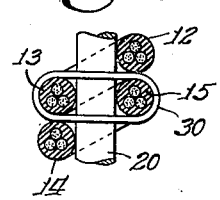

2,452,432

UNITED STATES PATENT OFFICE 2,452,432

METHOD OF MAKING ELASTIC COIL STRUCTURES WITH UNCOILED ENDS

Ralph D. Collins, Beverly Hills, Calif., assignor of one-half to Kellogg Switchboard and Supply Company, a corporation of Illinois Application February 9, 1945, Serial No. 577,111

2 Claims. (Cl. 18—6)

This invention relates to a method of making elastic coil structures with uncoiled ends.

It is now well known that retractile and extensible extension cords or cables, for various purposes, principally electrical, may be satisfactorily constructed by providing a conductor or a plurality of conductors with a covering or sheath of incompletely vulcanized rubber or the like, then closely coiling it into the form of a helix, and then vulcanizing it, after which the cable will be readily extensible, as, for example, for extension cord purposes, without damage thereto while being automatically retracted by its own resilience to closely coiled helical formation when released.

The present invention aims to provide an improved method for making cables of this class with straight connecting tails such as in this instance tangent ends, economically and expeditiously in quantity production.

The invention will be readily understood by reference to the following description, taken together with the accompanying drawings, showing an illustrative embodiment of the invention, and in which drawings—

Figure 1 is a view of means employed in accordance with the present disclosure for making elastic coil cables with tangent ends and showing the method of providing simultaneously a tangent end for both of two adjacent cables;

Figure 2 is a view of means employed as shown in Figure 1, but shown in Figure 2 in separated relation; and Figure 3 shows a single such cable with a tangent end thereon produced in accordance with the present disclosure;

Figure 4 shows a modification; and

Figure 5 is a cross-section on the line 5—5 of Fig. 4.

It will be understood that the drawings show only fragmentary portions of the cables themselves, since the helically coiled portion of these cables are not the essence of the present invention, such helically coiled elastic cables being already known to the art, and only sufficient of such portions being here shown as will illustrate the utility and function of the present invention, for such purpose it being here sufficient to point out that each of the extensible and retractible cables 10 and 11 includes a helically coiled portion 12 and a tangent end portion 13 for the cable 10, and similar helically coiled portion 14 and a tangent end portion 15 for the like cable 11. The cable itself includes, in this instance, a plurality of separately insulated conductor wires 16, 17 and 18 twisted together to form a central core for the cable and upon which has been extruded a cylindrical sheath 19 of rubberlike material, the whole forming the cable here referred to, which with the material 19 in vulcanizable condition, is coiled into helical form as at 12 and 14 advantageously upon a metal rod or mandrel 20.

For purposes of making electrical connection with the cable, it is frequently desirable that such cables have a tangent end such as 21, as for the cable 11 (Fig. 3) at one or both ends of the cable, and the present invention is directed to the production of such end or ends.

Accordingly, and following the present disclosure, the mandrel 20 is provided with means extending transversely thereof, such as, in this instance, the radially extending stake 22 for holding an uncoiled portion of a cable transverse to the helically coiled portion, and extending straight out from the coil, somewhat as in the manner of a tangent, while the whole is placed in an oven for vulcanizing the material 19 or otherwise curing it to cause the material to take a permanent set and to give it the resilient characteristics which permit the coiled cable to be readily extended, as for purposes of an extension cord, which upon release will automatically spring back to closely coiled form to conserve space.

In this instance, the transverse stake 21 is somewhat in the form of a spear of heavy wire stock pointed at both ends as at 23 and 24. The mandrel 20 may be provided, along its length as desired, with one or more socket-like perforations 25 into one of which (to suit the length of cable desired) one end of the stake 22 may be inserted as at 26 to maintain the stake extending radially outwardly of the mandrel.

As now the coiled portion 12 of the cable 10, for example, is formed in helical shape to the extent of such length as may be desired for it; the cable is then humped over the stake 22, thus forming the two legs of this hump previously referred to by the numerals 13 and 15. Where the cable passes over the outer end of the stake 22, it is bent thereover and the point 24 at this end digs slightly into soft rubber material 19 of the cable to maintain the cable in this form during vulcanization. The cable at the same time maintains the stake in position. Thus the uncoiled portion of the cable is prevented from coiling while the coiled portion is prevented from uncoiling. After the cable has been passed over the stake 22 to form the legs 13 and 15 of the hump, the helical winding of the cable is continued to form the adjacent cable 11, to such an extent as may be desired for this cable. It will be understood that the opposite adjacent ends of the cables 10 and 11 are not here shown, and that as already alluded to, the ends not here shown may be formed similarly to the ends which are here shown. Thus the uncoiled portion 13 or 15 is supported during vulcanization at a place therealong spaced from its juncture with the coiled portion and spaced from the axis of said coiled portion laterally of said coiled portion.

When the vulcanization has been completed, the hump in the cable formed by the legs 13 and 15 may be severed at its bight 27, and the cables removed from the mandrel 20 and from the stake 22, leaving the cable 11 for example with at one end the tangent portion 21, which was initially the hump leg 15, this tangent end 21 serving as a connecting tail for a desired electrical connection, the material 19 constituting the insulating sheath being removed as desired to expose the individual conductors 16, 17 and 18 for connection purposes, and the individual insulation on these wires being also removed as desired to suit such purposes. The severed tangent portion 13 at the same time forms a similar connecting tail for the cable 10.

In case only one cable is desired to be made at a time, with a tangent end at one or both ends, we may assume that this would be the cable 10 here shown, and that, instead of a complete cable 11 being formed as hereinbefore referred to, just sufficient of the coils 14 be formed to secure this portion to the mandrel during vulcanization, and thereafter the portions 15 and 14 being cut off and discarded, or in lieu of this attachment of the end, the cable portions 15 and 14 could be omitted entirely and the portion 13 merely attached to the stake 22 by being caught on the sharp point 24 of the stake and held outwardly from the mandrel in this way, the stake being illustrative of means for holding an uncoiled portion of the cable straight out from the mandrel during vulcanization.

In the modification shown in Figures 4 and 5 the sleeve 30 is passed over the loop 31 of the cable to hold the cable portions 13 and 15 extending outwardly transversely of the mandrel, thus constituting somewhat of a reversal of the structure of Figure 1, but accomplishing a similar purpose. The sleeve 30 may be of fairly stiff paper or cardboard and may be notched as at 32 interengaging with the mandrel. To apply the sleeve 30, a loop 31 may be first formed manually in the cable and then the sleeve 30 slipped thereover and pushed down to the mandrel, the loop itself providing space for the sleeve between the adjacent coils 12 and 13 of the cable. Thereafter the mandrel, with the cable and sleeve 30 thereon, is subjected to a vulcanizing treatment as before. The sleeve 30 is then removed and the legs 13 and 15 severed at 27 as in the first instance.

The invention is understood not to be limited to details of construction or operation shown for purposes of exemplification, and such changes may be made therein as fall within the scope of the appended claims without departing from the invention.

The invention having been described, what is here claimed is:

1. The method of making elastic coil structures with uncoiled ends, embodying a cord-like member including a vulcanizable material, which is characterized by the steps of forming a portion of the member into a coil, providing another portion of the member uncoiled, said uncoiled portion being provided by forming a hump in the member comprising a pair of legs, one leg extending integrally away from the coil and the other leg extending back toward the coil with a bight between said legs, holding the legs so extended to prevent coiling of the uncoiled portion and uncoiling of the coiled portion, vulcanizing the material while maintaining said coiled and uncoiled portions in said forms, and severing said hump adjacent said bight.

2. The method of making elastic coil structures with uncoiled ends, embodying an elastic cord-like member including a vulcanizable material, which is characterized by the steps of forming a portion of the member into a coil, providing another portion of the member uncoiled and extending away from its juncture with the coiled portion, holding said uncoiled portion supported at a place therealong spaced from said juncture and spaced from the axis of said coiled portion laterally of said coiled portion whereby to prevent coiling of the said uncoiled portion and uncoiling of the coiled portion, and vulcanizing the material while so maintaining said coiled and uncoiled portions.

RALPH D. COLLINS.

REFERENCES CITED

The following references are of record in the file of this patent:

UNITED STATES PATENTS

| Number | Name | Date |
| --- | --- | --- |
| 458,115 | Thomson | Aug. 18, 1891 |
| 2,039,475 | Campbell | May 5, 1936 |
| 2,271,057 | Barrans | Jan. 27, 1942 |
| 2,322,757 | Ward | June 29, 1943 |
| 2,339,683 | Cox | Jan. 18, 1944 |
| 2,394,762 | Geraty | Feb. 12, 1946 |